Patented Aug. 7, 1951

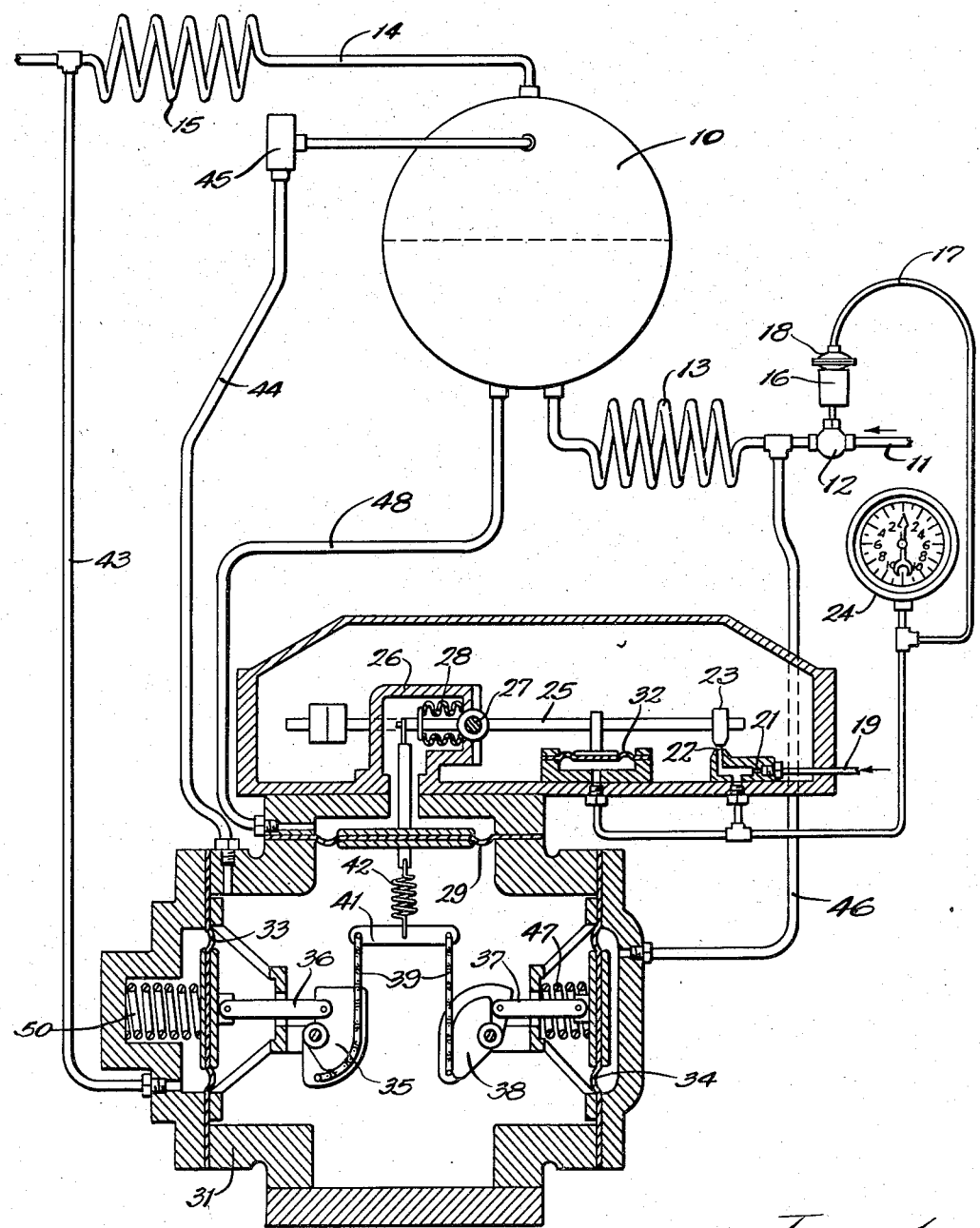

2,563,374

UNITED STATES PATENT OFFICE 2,563,374

PRESSURE OPERATED BOILER FEED
WATER CONTROL

Albert J. Rosenberger, Chicago, Ill., assignor to
Republic Flow Meters Company, Chicago, Ill.,
a corporation of Illinois Application February 2, 1946, Serial No. 645,045

7 Claims. (Cl. 122—451.2)

1

This invention relates to an apparatus for proportioning conditions and particularly to an apparatus for boiler feed water control to proportion the feed water supply to the boiler in accordance with the steam flow, water flow and water level.

In my copending application, Serial No. 599,-212, filed June 13, 1945, there is disclosed and claimed an apparatus in which one of a plurality of interrelated conditions is controlled jointly by all of the conditions and specifically in which the supply of feed water to a boiler is controlled jointly in response to steam flow, water flow and water level. It is one of the objects of the present invention to provide an apparatus operating according to the same principles as said prior application in which the necessity for using manometer tubes is eliminated.

Another object is to provide an apparatus for proportioning conditions in which diaphragms are employed responsive to the several conditions respectively and which are interconnected to produce a single controlling force for controlling one of the conditions.

A specific object of the invention is to provide a boiler feed water control in which the square roots of the movements of the diaphragms responsive to steam flow and water flow, respectively, are combined with the force on a diaphragm responsive to water level to produce a combined force for controlling water flow.

The above and other objects and advantages of the invention will be more readily apparent from the following description when read in connection with the accompanying drawing in which the single figure is a diagrammatic view with parts in section showing a boiler feed water control embodying the invention. As shown in the drawing, the apparatus is adapted to control the water level in a boiler drum indicated at 10, to maintain a proper operating level of water in the drum. The drum is supplied with water through a supply conduit 11, which is connected with the boiler through a control valve 12 and an economizer 13. The economizer serves in the present invention only as a restriction in the feed water supply conduit, and on those boilers which are not equipped with an economizer any desired type of restricting orifice may be provided. Steam from the boiler flows out through a steam pipe 14, and a superheater 15, which also serves for purposes of the present invention only as a restriction in the steam conduit.

The valve 12, which regulates the supply of feed water to the boiler, is controlled by a float-

2 ing regulator 16 responsive to variations in pressure in a pipe 17 which act on a diaphragm 18. The regulator is constructed to move the valve 12 toward open position when the pressure on the diaphragm is above normal and toward closed position when the pressure is below normal. When the pressure is normal the valve will be held in the position to which it has last been adjusted. Pressure is supplied to the pipe 17 from a source 19 which communicates through a restriction 21 with an orifice 22. The pipe 17 is connected to the orifice chamber between the restriction 21 and the orifice 22, so that pressure in the pipe will be regulated by the approach and recession of a valve 23 toward and away from the orifice. If desired, a gauge 24 may be provided to indicate the pressure in the pipe, thereby indicating the instantaneous condition of the system.

The valve 23 is mounted on one end of a beam 25 which extends to a closed housing 26 and is pivoted at 27 adjacent to the end of the housing. A flexible seal 28 is connected to the beam and the other end of the housing to prevent escape of fluid, this construction being substantially similar to that more particularly disposed and claimed in my Patent No. 2,299,179. The beam is adapted to be urged in one direction about its pivot by a flexible diaphragm 29, mounted in a closed housing 31 forming a pressure chamber, below and sealed to the housing 26. The diaphragm 29 normally urges the left end of the beam upward and the force of this diaphragm is balanced by a diaphragm 32 connected to the pipe 17. With this construction a regulated pressure will be produced back of the orifice 22 which is proportional to the force exerted on the beam by the diaphragm 29.

The effect of the diaphragm 29 on the beam is modified by diaphragms 33 and 34 mounted in the housing 31. The diaphragm 33 is connected to a pivoted cam member 35 through a link 36 so that the cam member will be turned in response to movements of the diaphragm. The diaphragm 34 is similarly connected through a link 37 to a pivoted cam member 38, whose axis is parallel to the pivotal axis of the cam 35. Flexible chains or straps 39 are secured to and overlie the cam members so that the straps will be shortened or lengthened as the cam members are turned. The cam members are so shaped and are so connected to the diaphragms 33 and 34 that as the cam members turn the movements of the chains or straps 39 will be proportional to the square roots of the diaphragm movements for a purpose which will appear more fully hereinafter. Thus the cams and chains form square root mechanisms to produce movements of or forces on the chains proportional to the square roots of the movements of or forces on the respective diaphragms. The chains 39 are connected to the opposite ends of a floating lever 41, whose central portion is connected through a spring 42 to the diaphragm 29. With this construction the total force exerted by the diaphragm 29 on the beam 25 will be responsive to the force exerted by the several diaphragms individually to produce a single combined force which is utilized for controlling the valve 12.

The diaphragm 33 in the construction illustrated is adapted to be responsive to steam flow. For this purpose the outer side of the diaphragm is connected through a pipe 43 with the steam conduit 14 beyond the superheater 15. The interior of the housing 31, to which all of the diaphragms are exposed, is connected through a pipe 44 and a constant level liquid pot 45 which serves to maintain the pipe 44 full of water to a constant level to the space in the drum 10 above the water level therein. The pot 45 maintains the pipe 44 full of liquid up to a constant level so that the pressure on the interior of the housing 31 will be equal to the constant head of liquid in the pipe 44, plus the steam pressure in the upper part of the boiler drum. The differential across the diaphragm 33 will, therefore, be proportional to the rate of steam flow from the boiler to produce a movement of the chain 39 connected to the cam 35 which is directly proportional to steam flow. Preferably, a spring 50 is provided, urging the diaphragm 33 inward of the chamber 31 since the internal pressure in the chamber is greater than that on the outer side of the diaphragm.

The diaphragm 34 is responsive to water flow to the boiler and for this purpose its outer side is connected through a pipe 46 to a point in the water supply conduit 11 between the valve 12 and the economizer 13. Preferably, a spring 47 urges the diaphragm 34 outward to balance the difference in pressure on its outer and inner sides. With this construction, the economizer 13 functions as a restriction so that the differential pressure across the diaphragm 34 will be proportional to the square of the water flow to produce a movement of the chain 39 through the cam 38 which is directly proportional to water flow. As the water flow changes, the pressure differential between the inlet to the economizer and the boiler will change and the diaphragm 34 will respond to this differential to move the cam 38.

The diaphragm 29 is responsive to water level in the boiler. For this purpose the outer or upper side of this diaphragm is connected through a pipe 48 to a point in the boiler below the normal water level therein. The differential pressure across the diaphragm 29 will be equal to the difference in liquid levels between the constant level in the pot 45 and the existing level in the boiler.

In operation of this construction the water flow and steam flow are normally balanced against each other to produce a normal constant tension on the spring 42. As long as these factors remain in balance so that the spring tension on spring 42 is constant, the valve 12 will remain in adjustment unless there is a change in water level in the boiler. A reduction in water level will reduce the pressure above the diaphragm 29 so that the upward force of this diaphragm on the beam 25 will increase to move the valve 23 toward the orifice 22. This increases the pressure in the pipe 17, causing the regulator 16 to open the valve 12 further. Upon a change in the relationship between steam flow and water flow, one or the other, or both, of the cams 35 and 38 will be turned to vary the force of the spring 42. For example, if steam flow should increase, the pressure on the outer side of the diaphragm 33 will decrease, allowing the cam 35 to turn counterclockwise. The cam 35 is shown in its maximum clockwise position. This reduces the tension on the spring 42, increasing the upward force of diaphragm 29 on the beam 25 to open the valve in the manner explained above. Thus, with this construction the flow of water to the boiler is controlled at all times in accordance with joint effects of steam flow and water flow to maintain the level in the boiler at the desired point under all operating conditions.

While the invention has been particularly described in connection with a water feed boiler control, it will be understood that it can be used equally well for other control functions in which one of a plurality of related conditions is to be controlled jointly by all of the conditions. The example particularly illustrated and described is, therefore, not to be taken as a definition of the scope of the invention, reference being had for this purpose to the appended claims.

What is claimed is:

1. Apparatus for proportioning interrelated conditions comprising a pressure chamber, a plurality of diaphragms in the chamber all exposed on one side to the interior of the chamber, means to communicate to the interior of the chamber an external pressure which is similarly related to all of the conditions, means to connect the other sides of the diaphragms to sources of pressures related to the several conditions respectively, means interconnecting the diaphragms to produce a combined force proportional to the forces exerted by all of the diaphragms, and means responsive to the combined force to control one of the conditions.

2. Apparatus for proportioning interrelated conditions comprising a pressure chamber, a plurality of diaphragms in the chamber all exposed on one side to the interior of the chamber, means to communicate to the interior of the chamber an external pressure which is similarly related to all of the conditions, means to connect the other sides of the diaphragms to sources of pressures related to the several conditions respectively, a proportioning linkage connected to two of the diaphragms to produce a resultant force proportional to the forces exerted by the diaphragms, means connecting the linkage to a third diaphragm to produce a combined force proportional to the resultant force and the force exerted by the third diaphragm, and means responsive to the combined force to control one of the conditions.

3. Apparatus for proportioning interrelated conditions comprising a pressure chamber, a plurality of diaphragms in the chamber all exposed on one side to the interior of the chamber, means to communicate to the interior of the chamber a pressure which is related to all of the conditions, means to connect the other sides of the diaphragms to sources of pressures related to the several conditions respectively, a pair of cam members movable about parallel pivots and connected to two of the diaphragms respectively to be moved thereby, a floating lever, flexible straps connected to the ends of the lever and to the cam members, the cam members being so shaped and so connected to their respective diaphragms as to produce movements of the straps proportional to the square roots of the pressures across the diaphragms, means connecting the lever to a third diaphragm, and means responsive to the total force on the third diaphragm to control one of the conditions.

4. Apparatus for proportioning interrelated conditions comprising a pressure chamber, a plurality of diaphragms in the chamber all exposed on one side to the interior of the chamber, means to communicate to the interior of the chamber a pressure which is related to all of the conditions, means to connect the other sides of the diaphragms to sources of pressures related to the several conditions respectively, a pair of cam members movable about parallel pivots and connected to two of the diaphragms respectively to be moved thereby, a floating lever, flexible straps connected to the ends of the lever and to the cam members, the cam members being so shaped and so connected to their respective diaphragms as to produce movements of the straps proportional to the square roots of the pressures across the diaphragms, a spring connecting the central part of the lever to a third diaphragm, and means responsive to the total force on the third diaphragm to control one of the conditions.

5. Boiler feedwater control apparatus comprising a first diaphragm connected across a restriction in a steam flow line from the boiler, a second diaphragm connected across a restriction in a water flow line to the boiler, a third diaphragm connected to points at different levels in the boiler, mechanisms connected to the first and second diaphragms to produce movements proportional to the square roots of the diaphragm movements, a floating lever, means connecting the ends of the lever to said mechanisms, a spring connecting the center part of the lever to the third diaphragm, and means responsive to the total force on the third diaphragm to control the flow of water to the boiler.

6. Boiler feedwater control apparatus comprising a first diaphragm connected across a restriction in a steam flow line from the boiler, a second diaphragm connected across a restriction in a water flow line to the boiler, a third diaphragm connected to points at different levels in the boiler, mechanisms connected to the first and second diaphragms to produce movements proportional to the square roots of the diaphragm movements, a floating lever, means connecting the ends of the lever to said mechanisms, a spring connecting the center part of the lever to the third diaphragm, a pivoted beam connected adjacent one end to the third diaphragm, means responsive to movements of the beam to produce a regulated pressure, means responsive to the regulated pressure connected to the beam to balance the force exerted thereon by the third diaphragm, and means responsive to the regulated pressure to control the water flow to the boiler.

7. Boiler feedwater control apparatus comprising a pressure chamber, a plurality of diaphragms in the chamber all exposed on one side to the interior of the chamber, a connection from the interior of the chamber to the steam space within the boiler, means to connect the other sides of the diaphragms respectively to the lower part of the boiler and to points in the feedwater supply line and steam line at points spaced from the boiler, means interconnecting the diaphragms to produce a combined force proportional to the forces exerted by all of the diaphragms, and means responsive to the combined force to control the supply of water to the boiler.

ALBERT J. ROSENBERGER.

REFERENCES CITED

The following references are of record in the file of this patent:

UNITED STATES PATENTS

| Number | Name | Date |
| --- | --- | --- |
| 1,940,829 | Veenschoten | Dec. 26, 1933 |
| 1,962,678 | Johnson | June 12, 1934 |

FOREIGN PATENTS

| Number | Country | Date |
| --- | --- | --- |
| 285,193 | Germany | June 22, 1915 |
| 490,607 | Great Britain | 1938 |
| 702,171 | Germany | 1941 |